US00RE47166E

(19) United States
(12) Reissued Patent
Buchanan et al.

(10) Patent Number: US RE47,166 E
(45) Date of Reissued Patent: Dec. 18, 2018

(54) TONER CARTRIDGE HAVING LOADING AND LATCHING FEATURES

(71) Applicant: Lexmark International, Inc., Lexington, KY (US)

(72) Inventors: John Andrew Buchanan, Charlotte, NC (US); Gregory Alan Cavill, Winchester, KY (US); James Richard Leemhuis, Lexington, KY (US); Randal Scott Williamson, Georgetown, KY (US)

(73) Assignee: Lexmark International, Inc., Lexington, KY (US)

(21) Appl. No.: 15/786,987

(22) Filed: Oct. 18, 2017

Related U.S. Patent Documents

Reissue of:
(64) Patent No.: 9,164,425
Issued: Oct. 20, 2015
Appl. No.: 14/058,352
Filed: Oct. 21, 2013

U.S. Applications:
(60) Provisional application No. 61/888,698, filed on Oct. 9, 2013.

(51) Int. Cl.
*G03G 21/16* (2006.01)
*G03G 15/08* (2006.01)

(52) U.S. Cl.
CPC ..... *G03G 15/0875* (2013.01); *G03G 15/0865* (2013.01)

(58) Field of Classification Search
CPC ..... G03G 15/0875; G03G 15/0865; B41J 2/17553
See application file for complete search history.

(56) References Cited

U.S. PATENT DOCUMENTS 5,066,976 A 11/1991 Kanagawa et al.
5,313,993 A * 5/1994 Corby et al. ..... 141/364
(Continued)

FOREIGN PATENT DOCUMENTS

JP H08-030079 A 2/1996
JP 2000-231322 A 8/2000
(Continued)

OTHER PUBLICATIONS

English translation of Office Action dated Nov. 8, 2017 for Colombia Patent Application No. 16-119692.
(Continued)

*Primary Examiner* — Sara S Clarke

(57) ABSTRACT

A toner cartridge according to one example embodiment includes a housing having a front, rear, first side, second side, top and bottom forming a toner reservoir. An outlet port is positioned on the front of the housing proximate the first side for transferring toner out of the reservoir. A drive gear is positioned on the front of the housing and has a center proximate the second side for receiving rotational power. A cavity is formed in the bottom of the housing. A latch catch is positioned in the cavity on an inner side of the front of the housing for receiving a latch for securing the toner cartridge in an image forming device. The latch catch is positioned closer to the bottom of the housing than the outlet port and the drive gear and between the center of the drive gear and the outlet port in the side-to-side direction.

21 Claims, 11 Drawing Sheets

(56) References Cited

U.S. PATENT DOCUMENTS

| | | | | |
|---|---|---|---|---|
| 5,434,655 | A | 7/1995 | Okamura | |
| 5,583,612 | A | 12/1996 | Schell et al. | |
| 5,758,233 | A | 5/1998 | Coffey et al. | |
| 5,819,139 | A | 10/1998 | Harlan et al. | |
| 5,842,093 | A * | 11/1998 | Tanda | 399/263 |
| 6,115,571 | A * | 9/2000 | Kobayashi | 399/119 |
| 6,134,410 | A | 10/2000 | Nakajima | |
| 6,301,456 | B1 | 10/2001 | Horrall et al. | |
| 6,386,681 | B1 | 5/2002 | Askren et al. | |
| 6,530,399 | B2 | 3/2003 | Nguyen et al. | |
| 6,692,107 | B2 | 2/2004 | Lattuca et al. | |
| 6,980,758 | B2 | 12/2005 | Murayama et al. | |
| 7,133,629 | B2 | 11/2006 | Kita | |
| 7,136,609 | B2 | 11/2006 | Askren et al. | |
| 7,159,973 | B2 | 1/2007 | Buchanan et al. | |
| 7,168,799 | B2 | 1/2007 | Benson et al. | |
| 7,174,121 | B2 * | 2/2007 | Kuma et al. | 399/258 |
| 7,258,558 | B1 | 8/2007 | Dawson et al. | |
| 7,272,336 | B1 | 9/2007 | Dawson et al. | |
| 7,305,204 | B2 | 12/2007 | Carter et al. | |
| 7,536,122 | B2 | 5/2009 | Ohkawa et al. | |
| 7,641,313 | B2 | 1/2010 | LaBar | |
| 7,702,262 | B2 | 4/2010 | Taguchi et al. | |
| 7,706,699 | B2 | 4/2010 | Taguchi et al. | |
| 7,734,230 | B2 | 6/2010 | Takami | |
| 7,769,321 | B2 | 8/2010 | Tanaka | |
| 7,822,371 | B2 | 10/2010 | Taguchi et al. | |
| 7,831,168 | B2 | 11/2010 | Allen et al. | |
| 7,840,165 | B2 | 11/2010 | Okuda | |
| 7,853,184 | B2 | 12/2010 | Taguchi et al. | |
| 7,905,572 | B2 | 3/2011 | Anderson, Jr. et al. | |
| 7,953,347 | B2 | 5/2011 | Dawson et al. | |
| 7,992,982 | B2 | 8/2011 | Scharf et al. | |
| 8,200,126 | B2 | 6/2012 | Chaudhuri et al. | |
| 8,229,331 | B2 | 7/2012 | Takiguchi et al. | |
| 8,292,411 | B2 | 10/2012 | Anderson, Jr. et al. | |
| 8,342,642 | B2 | 1/2013 | Bailey et al. | |
| 8,401,434 | B2 | 3/2013 | Akaike | |
| 8,567,932 | B2 | 10/2013 | James, III et al. | |
| 8,761,639 | B1 | 6/2014 | Leemhuis et al. | |
| 8,792,809 | B2 | 7/2014 | Kenji et al. | |
| 8,909,093 | B2 | 12/2014 | Kenji et al. | |
| 9,152,083 | B2 | 10/2015 | Buchanan et al. | |
| 9,229,367 | B2 | 1/2016 | Leemhuis et al. | |
| 9,280,087 | B2 | 3/2016 | Leemhuis et al. | |
| 2002/0057317 | A1 | 5/2002 | Cowger et al. | |
| 2003/0053819 | A1 | 3/2003 | Nomura et al. | |
| 2003/0219284 | A1 | 11/2003 | Ishiguro et al. | |
| 2005/0265736 | A1 | 12/2005 | Seto et al. | |
| 2006/0013621 | A1 | 1/2006 | Kimura et al. | |
| 2007/0098455 | A1 | 5/2007 | Kuma et al. | |
| 2007/0229619 | A1 | 10/2007 | Sugahara et al. | |
| 2008/0145095 | A1 | 6/2008 | Hoshi et al. | |
| 2008/0159772 | A1 | 7/2008 | Koishi et al. | |
| 2009/0016779 | A1 | 1/2009 | Hwang | |
| 2009/0080909 | A1 | 3/2009 | Usui et al. | |
| 2009/0142103 | A1 * | 6/2009 | Chaudhuri et al. | 399/262 |
| 2010/0322676 | A1 * | 12/2010 | Dawson et al. | 399/262 |
| 2011/0091222 | A1 | 4/2011 | Kim et al. | |
| 2011/0129252 | A1 | 6/2011 | Oda et al. | |
| 2012/0163877 | A1 | 6/2012 | Kikuchi et al. | |
| 2012/0315066 | A1 | 12/2012 | Dawson et al. | |
| 2013/0147885 | A1 | 6/2013 | Harvey et al. | |
| 2013/0170867 | A1 | 7/2013 | Acosta et al. | |
| 2013/0170868 | A1 | 7/2013 | Acosta et al. | |
| 2013/0209141 | A1 | 8/2013 | Hackney et al. | |
| 2013/0287448 | A1 | 10/2013 | Baker et al. | |
| 2014/0169824 | A1 | 6/2014 | Seto et al. | |

FOREIGN PATENT DOCUMENTS

| | | | |
|---|---|---|---|
| JP | 2001-175077 | A | 6/2001 |
| JP | 2001-242692 | A | 9/2001 |
| JP | 2004-258472 | A | 9/2004 |
| JP | 2005-031109 | A | 2/2005 |
| JP | 2009-080477 | A | 4/2009 |
| JP | 2009-134097 | A | 6/2009 |
| JP | 2011-221452 | A | 11/2011 |

OTHER PUBLICATIONS

English translation of Office Action dated Jul. 26, 2017 for Colombia Patent Application No. 16-119692.
English translation of Office Action dated Jan. 16, 2017 for Taiwan Patent Application No. 103132775.
JPO machine translation of JP2009-134097A.
JPO machine translation of JP2009-080477A.
JPO machine translation of JPH08-030079A.
Non-Final Office Action dated Sep. 10, 2014 for U.S. Appl. No. 14/058,370.
International Search Report and Written Opinion of the International Searching Authority dated Dec. 31, 2014 for PCT Application No. PCT/US14/58007.
International Search Report and Written Opinion of the International Searching Authority dated Oct. 15, 2014 for PCT Application No. PCT/US14/40463.
International Search Report and Written Opinion of the International Searching Authority dated Oct. 15, 2014 for PCT Application No. PCT/US14/40467.
Office Action dated Mar. 15, 2017 for Canada Patent Application No. 2,923,632.
Extended European Search Report dated May 19, 2017 for European Patent Application No. 14851604.0.
English translation of Office Action dated Nov. 3, 2016 for South Korea Patent Application No. 10-2016-7012150.
JPO machine translation of JP2011-221452A.
JPO machine translation of JP2001-175077A.
JPO machine translation of JP2004-258472A.
English translation of Office Action dated Jun. 2, 2016 for Colombia Patent Application No. 16-119692.
Prosecution history of U.S. Appl. No. 14/058,370 including Non-Final Office Action dated Sep. 10, 2014.
U.S. Appl. No. 14/084,906, filed Nov. 20, 2013.
U.S. Appl. No. 14/084,885, filed Nov. 20, 2013.
U.S. Appl. No. 14/058,370, filed Oct. 21, 2013.
U.S. Appl. No. 14/058,382, filed Oct. 21, 2013.
Final Office Action dated Jan. 23, 2015 for U.S. Appl. No. 14/058,370.
Non-Final Office Action dated Dec. 29, 2014 for U.S. Appl. No. 14/058,382.
Final Office Action dated Jun. 11, 2015 for U.S. Appl. No. 14/058,382.

* cited by examiner

TONER CARTRIDGE HAVING LOADING AND LATCHING FEATURES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCES TO RELATED APPLICATIONS

This application claims priority to U.S. Provisional Patent Application Ser. No. 61/888,698, filed Oct. 9, 2013, entitled "Toner Cartridge Loading and Latching," the content of which is hereby incorporated by reference in its entirety.

BACKGROUND

1. Field of the Disclosure

The present invention relates generally to electrophotographic printers and more particularly to a toner cartridge loading and latching features.

2. Description of the Related Art

In order to reduce the premature replacement of components traditionally housed within a toner cartridge for an image forming device, toner cartridge manufacturers have begun to separate components having a longer life from those having a shorter life into separate replaceable units. Relatively longer life components such as a developer roll, a toner adder roll and a doctor blade are positioned in one replaceable unit (a developer unit). The image forming device's toner supply, which is consumed relatively quickly in comparison with the components housed in the developer unit, is provided in a reservoir in a separate replaceable unit in the form of a toner cartridge that mates with the developer unit. In this configuration, the number of components housed in the toner cartridge is reduced in comparison with traditional toner cartridges.

It is important that the toner cartridge is precisely aligned within the image forming device. If the toner cartridge is misaligned, the exit port on the toner cartridge may not seal against the entrance port on the developer unit potentially causing severe toner leakage which may result in mechanical and print quality defects. Further, if the toner cartridge is misaligned, a drive gear on the toner cartridge may not achieve proper gear mesh with a corresponding drive gear in the image forming device potentially resulting in gear cogging. The toner cartridge must also be rigidly held in place after it is installed in the image forming device in order to prevent the positional alignment of the toner cartridge from being disturbed during operation. The requirement for tight positional control must be balanced with the need to permit a user to easily load and unload the toner cartridge into and out of the image forming device. Accordingly, it will be appreciated that precise alignment of the cartridge and relatively simple insertion of the cartridge into the image forming device is desired.

SUMMARY

A toner cartridge for use in an image forming device according to a first example embodiment includes a housing having a front, a rear opposite the front, a first side, a second side opposite the first side, a top and a bottom opposite the top. The housing has a reservoir for holding toner. An outlet port is positioned on the front of the housing proximate the first side for transferring toner out of the reservoir. A drive gear is positioned on the front of the housing and has a center proximate the second side for receiving rotational power when the toner cartridge is installed in the image forming device. A cavity is formed in the bottom of the housing. A latch catch is positioned in the cavity on an inner side of the front of the housing for receiving a latch for securing the toner cartridge in the image forming device. The latch catch is positioned closer to the bottom of the housing than the outlet port and the drive gear. The latch catch is positioned between the center of the drive gear and the outlet port in the side-to-side direction.

A toner cartridge for use in an image forming device according to a second example embodiment includes a housing having a front, a rear opposite the front, a first side, a second side opposite the first side, a top and a bottom opposite the top. The housing has a reservoir for holding toner. An outlet port is positioned on the front of the housing proximate the first side for transferring toner out of the reservoir. A drive gear is positioned on the front of the housing and has a center proximate the second side for receiving rotational power when the toner cartridge is installed in the image forming device. A cavity is formed in the bottom of the housing. An electrical connector is positioned in the cavity for establishing a communications link when the toner cartridge is installed in the image forming device. A latch catch is positioned on the front of the housing and unobstructed to receive a latch from within the cavity on an inner side of the front of the housing for securing the toner cartridge in the image forming device. The latch catch is positioned closer to the bottom of the housing than the outlet port and the drive gear. The latch catch is positioned between the center of the drive gear and the outlet port in the side-to-side direction.

A toner cartridge for use in an image forming device according to a third example embodiment includes a housing having a front, a rear opposite the front, a first side, a second side opposite the first side, a top and a bottom opposite the top. The housing has a reservoir for holding toner. An outlet port is positioned on the front of the housing proximate the first side for transferring toner out of the reservoir. A drive gear is positioned on the front of the housing and has a center proximate the second side for receiving rotational power when the toner cartridge is installed in the image forming device. A cavity is formed in the bottom of the housing. An electrical connector is positioned in the cavity for establishing a communications link when the toner cartridge is installed in the image forming device. A latch receiving shelf is positioned in the cavity on an inner side of the front of the housing unobstructed to receive a latch for securing the toner cartridge in the image forming device. The latch receiving shelf defines the vertical position of the toner cartridge when the toner cartridge is installed in the image forming device. The latch receiving shelf is positioned closer to the bottom of the housing than the outlet port and the drive gear. The latch receiving shelf is positioned between the center of the drive gear and the outlet port in the side-to-side direction.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
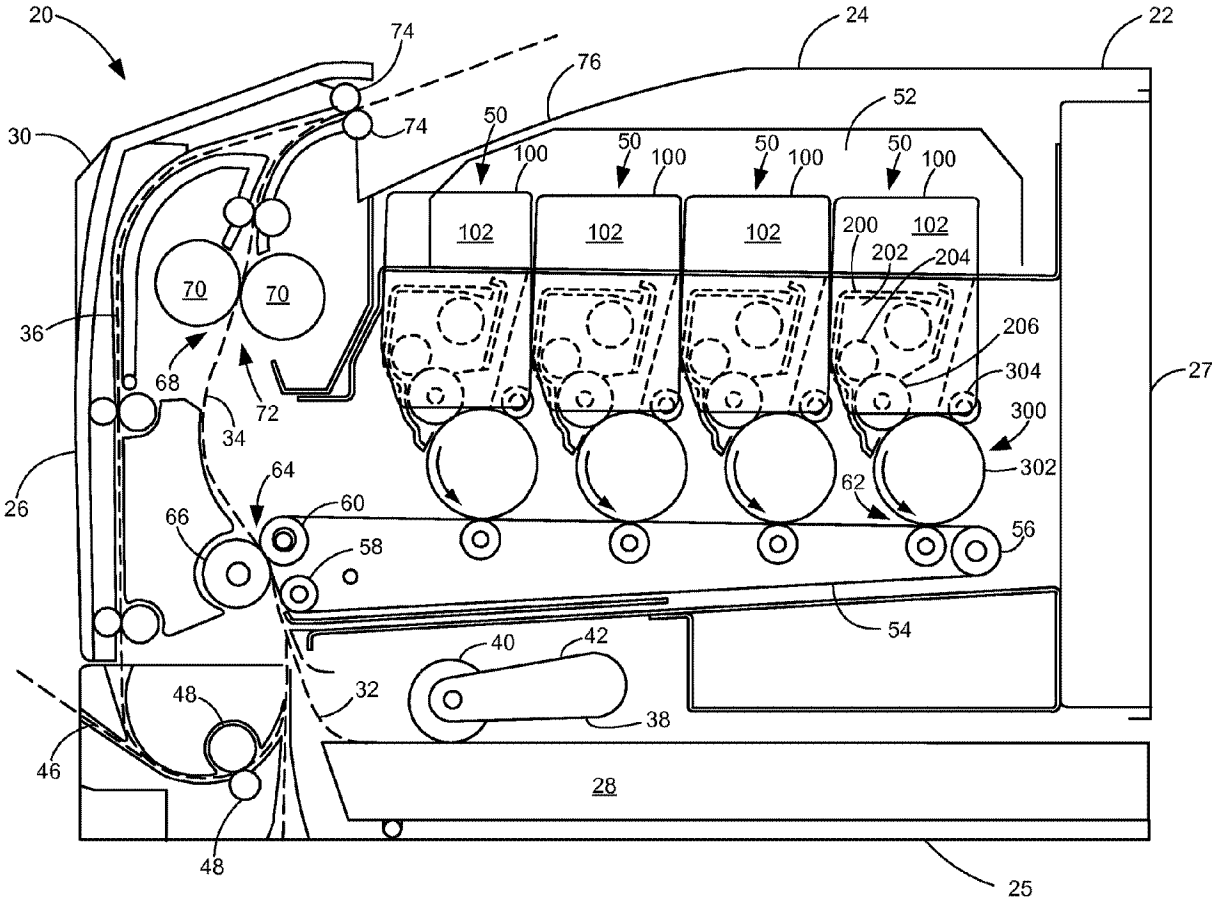
FIG. 1 is a schematic side view of the interior of an image forming device according to one example embodiment.

FIG. 1 illustrates a schematic view of the interior of an example image forming device 20. Image forming device 20 includes a housing 22 having a top 24, bottom 25, front 26 and rear 27. Housing 22 includes one or more input trays 28 positioned therein. Trays 28 are sized to contain a stack of media sheets. As used herein, the term media is meant to encompass not only paper but also labels, envelopes, fabrics, photographic paper or any other desired substrate. Trays 28 are preferably removable for refilling. A control panel 30 may be located on housing 22. Using control panel 30, the user is able to enter commands and generally control the operation of the image forming device 20. For example, the user may enter commands to switch modes (e.g., color mode, monochrome mode), view the number of pages printed, etc. A media path 32 extends through image forming device 20 for moving the media sheets through the image transfer process. Media path 32 includes a simplex path 34 and may include a duplex path 36. A media sheet is introduced into simplex path 34 from tray 28 by a pick mechanism 38. In the example embodiment shown, pick mechanism 38 includes a roll 40 positioned at the end of a pivotable arm 42. Roll 40 rotates to move the media sheet from tray 28 and into media path 32. The media sheet is then moved along media path 32 by various transport rollers. Media sheets may also be introduced into media path 32 by a manual feed 46 having one or more rolls 48.

Image forming device 20 includes an image transfer section that includes one or more imaging stations 50. Each imaging station 50 includes a cartridge 100 and a developer unit 200 mounted on a common photoconductive unit 300. Each toner cartridge 100 includes a reservoir 102 for holding toner and an outlet port in communication with an inlet port of a corresponding developer unit 200 for transferring toner from reservoir 102 to developer unit 200 as discussed in greater detail below. One or more agitating members may be positioned within reservoir 102 to aid in moving the toner. Each developer unit 200 includes a toner reservoir 202 and a toner adder roll 204 that moves toner from reservoir 202 to a developer roll 206. The photoconductive unit 300 includes a charging roll 304 and a photoconductive (PC) drum 302 for each imaging station 50. PC drums 302 are mounted substantially parallel to each other. For purposes of clarity, developer unit 200, PC drum 302 and charging roll 304 are labeled on only one of the imaging stations 50. In the example embodiment illustrated, each imaging station 50 is substantially the same except for the color of toner.

Each charging roll 304 forms a nip with the corresponding PC drum 302. During a print operation, charging roll 304 charges the surface of PC drum 302 to a specified voltage such as, for example, −1000 volts. A laser beam from a printhead 52 associated with each imaging station 50 is then directed to the surface of PC drum 302 and selectively discharges those areas it contacts to form a latent image. In one embodiment, areas on PC drum 302 illuminated by the laser beam are discharged to approximately −300 volts. Developer roll 206, which forms a nip with the corresponding PC drum 302, then transfers toner to PC drum 302 to form a toner image. A metering device such as a doctor blade assembly can be used to meter toner onto developer roll 206 and apply a desired charge on the toner prior to its transfer to PC drum 302. The toner is attracted to the areas of PC drum 302 surface discharged by the laser beam from the printhead 52.

An intermediate transfer mechanism (ITM) 54 is disposed adjacent to the imaging stations 50. In this embodiment, ITM 54 is formed as an endless belt trained about a drive roll 56, a tension roll 58 and a back-up roll 60. During image forming operations, ITM 54 moves past imaging stations 50 in a clockwise direction as viewed in FIG. 1. One or more of PC drums 302 apply toner images in their respective colors to ITM 54 at a first transfer nip 62. In one embodiment, a positive voltage field attracts the toner image from PC drums 302 to the surface of the moving ITM 54. ITM 54 rotates and collects the one or more toner images from imaging stations 50 and then conveys the toner images to a media sheet at a second transfer nip 64 formed between a transfer roll 66 and ITM 54, which is supported by back-up roll 60. In an alternative embodiment, instead of using an ITM 54 to transfer toner from PC drums 302 to a media sheet, toner is transferred directly from each PC drum 302 to the media sheet as is known in the art.

A media sheet advancing through simplex path 34 receives the toner image from ITM 54 as it moves through the second transfer nip 64. The media sheet with the toner image is then moved along the media path 32 and into a fuser area 68. Fuser area 68 includes fusing rolls or belts 70 that form a nip 72 to adhere the toner image to the media sheet. The fused media sheet then passes through exit rolls 74 that are located downstream from the fuser area 68. Exit rolls 74 may be rotated in either forward or reverse directions. In a forward direction, the exit rolls 74 move the media sheet from simplex path 34 to an output area 76 on top 24 of image forming device 20. In a reverse direction, exit rolls 74 move the media sheet into duplex path 36 for image formation on a second side of the media sheet.

Figure 2:
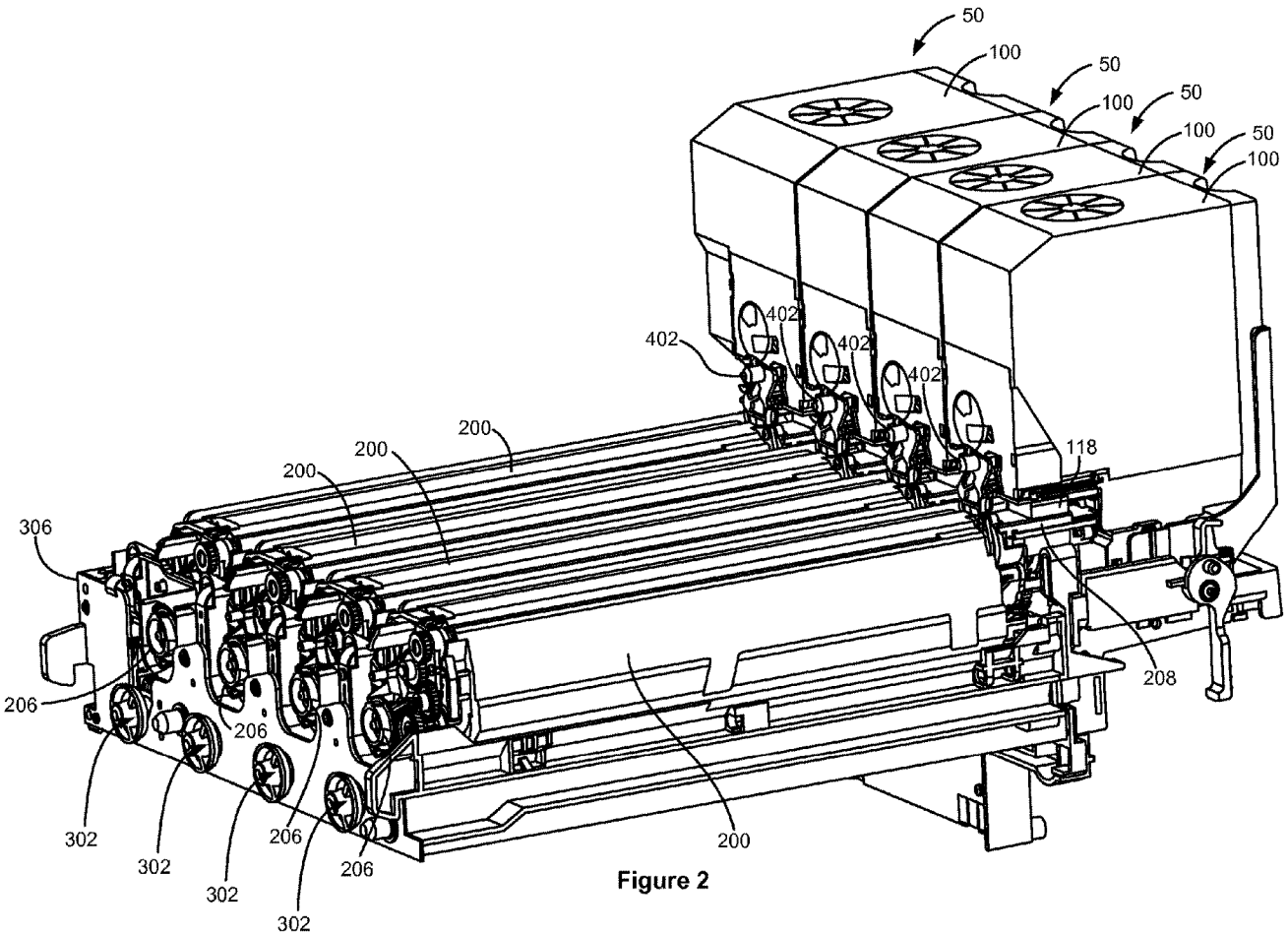
FIG. 2 is a perspective view of four imaging stations each having a toner cartridge and a developer unit for use with the image forming device according to one example embodiment.

A monocolor image forming device 20 may include a single imaging station 50, as compared to a color image forming device 20 that may include multiple imaging stations 50. FIG. 2 illustrates a set of four imaging stations 50 that each includes a respective toner cartridge 100, developer unit 200, and PC drum 302 mounted in a frame 306 of PC unit 300. In one embodiment, frame 306 is manufactured out of stamped metal plates that result in precise control of the location of PC drums 302 relative to one another and relative to ITM belt 54, printhead 52, and drive modules within image forming device 20. Frame 306 includes a central opening sized to receive developer units 200 and to mate developer rolls 206 with their respective PC drums 302.

Figure 6:
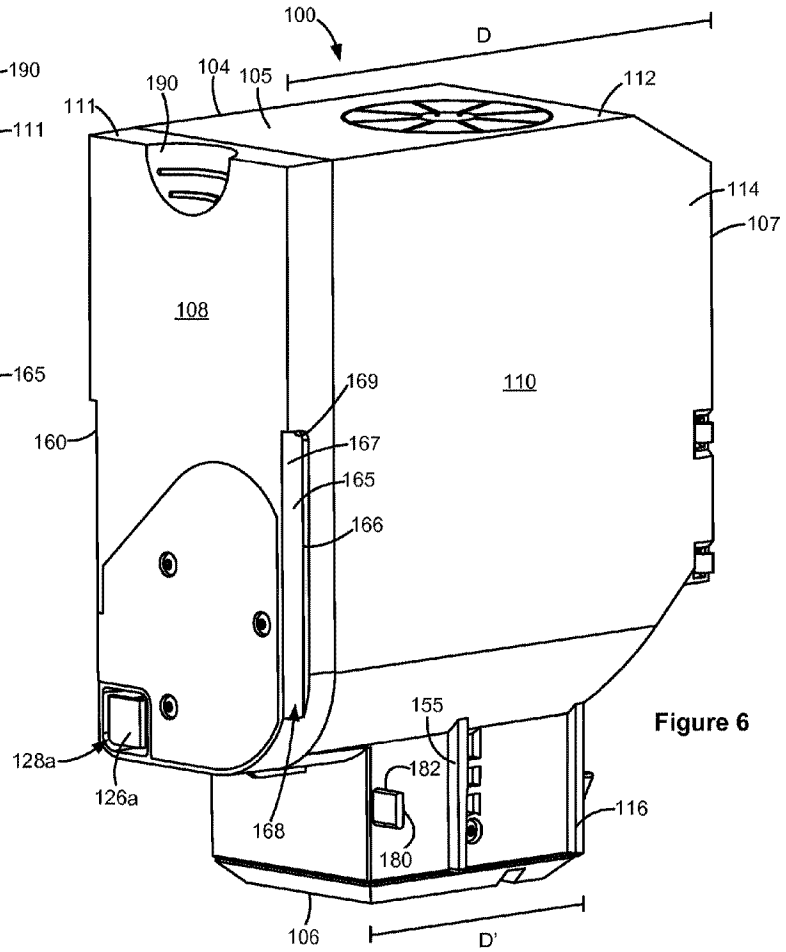
FIG. 6 is a second rear perspective view of the toner cartridge shown in FIGS. 3-5.

FIGS. 3-6 show a toner cartridge 100 in greater detail according to one example embodiment. Toner cartridge 100 includes a housing 104 having a top 105, a bottom 106, a front 107, a rear 108 and a pair of sides 109, 110 and forming reservoir 102 therein. In one embodiment, housing 104 is comprised of an end cap 111 mounted on, such as by ultrasonic welding, a main housing 112 at the rear 108 of cartridge 100. Housing 104 includes a main section 114 and an extension section 116. Extension section 116 is positioned at the bottom 106 of housing 104. As illustrated in FIG. 6, a depth D' of extension section 116 measured between the front 107 and rear 108 is smaller than a depth D of main section 114. Toner cartridge 100 includes an overall height measured between top 105 and bottom 106. In one embodiment, extension section 116 includes a smaller height than main section 114.

Toner cartridge 100 includes an outlet port 118 for transferring toner to developer unit 200 through an inlet port 208 of developer unit 200 (FIG. 2). Outlet port 118 is formed as a downward facing opening on main section 114 on the front 107 of housing 104 near side 109. In one embodiment, a shutter 120 is positioned on a bottom portion of main section 114 of housing 104 and is slidably movable between an open position and a closed position. In the open position, shutter 120 permits toner to flow from outlet port 118 of cartridge 100 through an opening 122 in shutter 120. In the closed position, shutter 120 blocks outlet port 118 to prevent toner from escaping cartridge 100. Shutter 120 is biased toward the closed position blocking outlet port 118. For example, one or more extension springs 124 may bias shutter 120 toward the closed position as shown.

Figure 4:
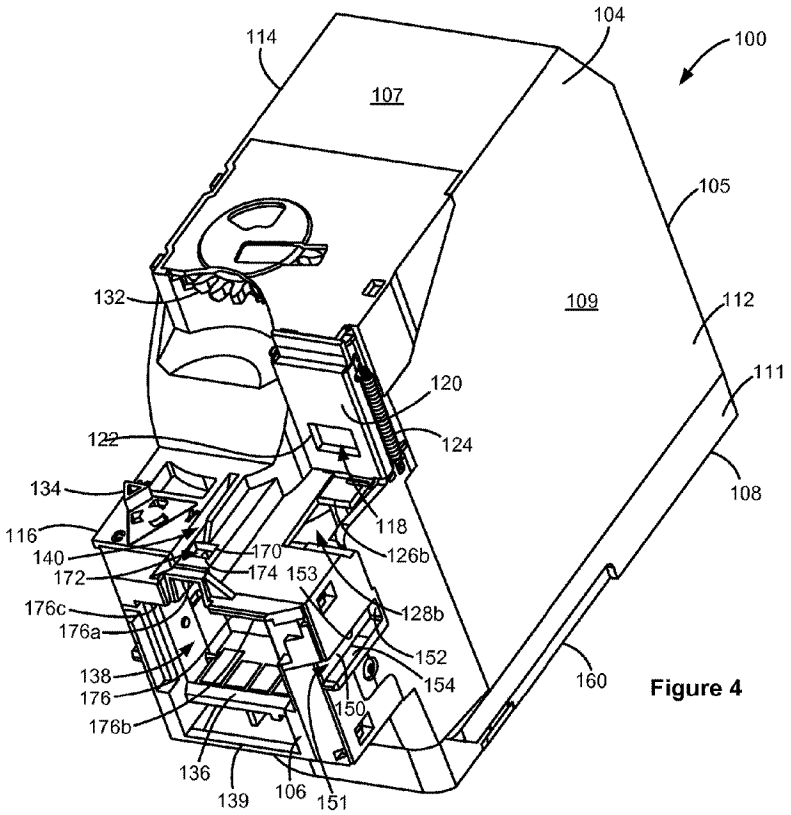
FIG. 4 is a front perspective view of the toner cartridge shown in FIG. 3.
Figure 3:
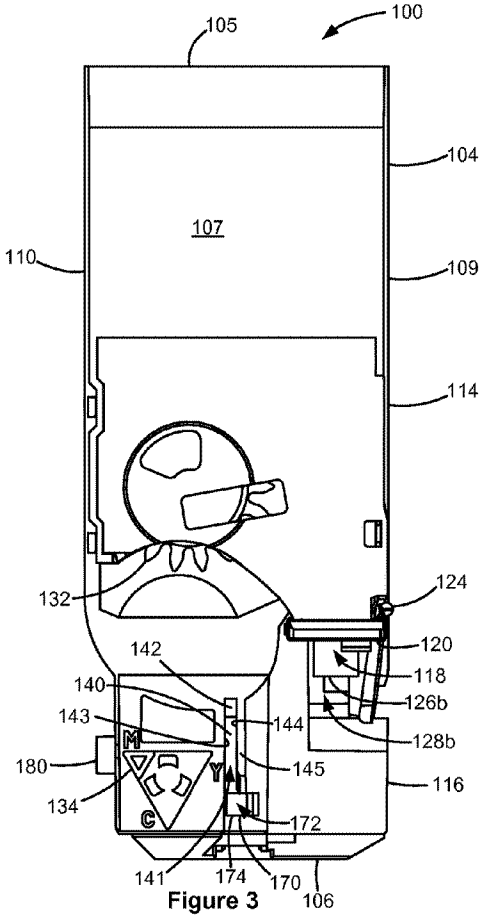
FIG. 3 is a front elevation view of a toner cartridge according to one example embodiment.
Figure 5:
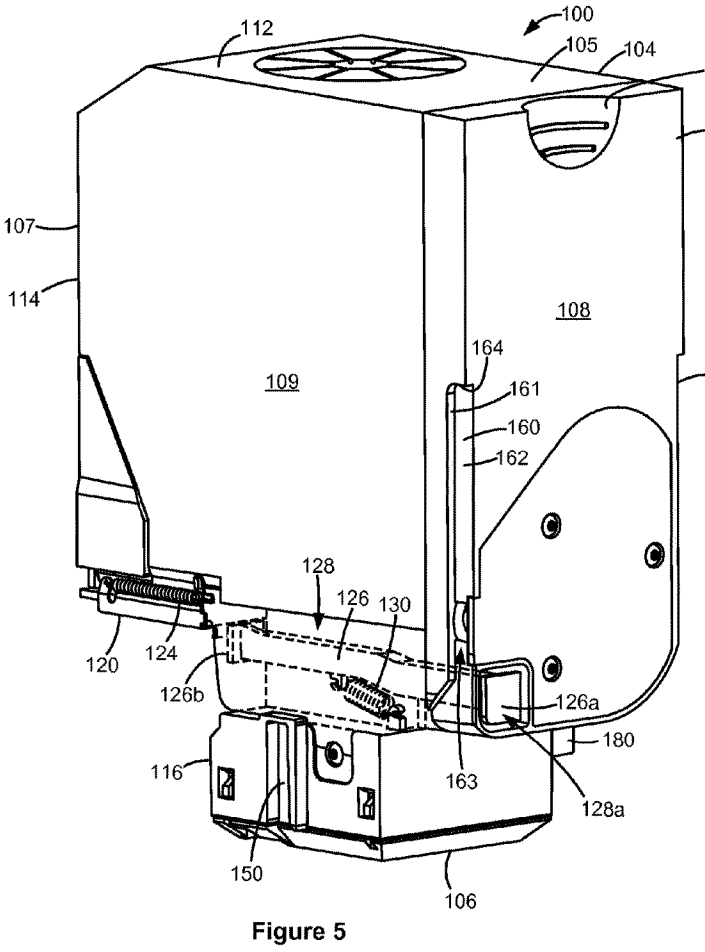
FIG. 5 is a first rear perspective view of the toner cartridge shown in FIGS. 3 and 4.

In the example embodiment shown, toner cartridge 100 also includes an engagement member such as a plunger 126 that is positioned to open shutter 120 when toner cartridge 100 is installed and mated with developer unit 200 and an access door to image forming device 20 is closed. Plunger 126 extends through a channel 128 in housing 104. Channel 128 extends from rear 108 of housing 104 to front 107 of housing 104 below outlet port 118. Channel 128 includes a rear opening 128a and a front opening 128b. With reference to FIGS. 5 and 6, a rear end 126a of plunger 126 is exposed at rear opening 128a of channel 128 to receive an actuation force from an actuation member, such as a plunger, rib, projection, arm, etc., operatively coupled to an access door of image forming device 20 when the access door is closed. With reference to FIGS. 3 and 4, a front end 126b of plunger 126 is exposed at front opening 128b of channel 128 to allow plunger 126 to contact shutter 120 and push shutter 120 from its closed position to its open position when plunger 126 receives the actuation force. Plunger 126 is biased by one or more biasing members, such as an extension spring 130 (FIG. 5), toward rear 108 of housing 104 with rear end 126a of plunger 126 exposed to receive the actuation member of image forming device 20. In the example embodiment illustrated, spring 130 is connected at one end to plunger 126 and at the other end to a portion of housing 104 within channel 128.

Toner cartridge 100 further includes a drive gear 132 positioned on the front 107 of housing 104. Drive gear 132 meshes with and receives rotational power from a corresponding gear 402 (FIG. 2) in image forming device 20 in order to provide rotational power to various paddles and/or agitators and an auger positioned within reservoir 102 for moving toner to outlet port 118. In the example embodiment illustrated, drive gear 132 is partially covered with only a few teeth exposed on a bottom portion thereof. Drive gear 132 is positioned on main section 114 of housing 104 above outlet port 118 near side 110.

Where multiple toner cartridges 100 are used with a single image forming device 20, toner cartridge 100 may include a keying structure 134 that prevents a toner cartridge 100 from being inserted in the wrong location. For example, where each toner cartridge 100 in image forming device 20 provides a different color toner, such as where toner cartridges having black, cyan, yellow and magenta toners are used, keying structure 134 prevents each toner cartridge 100 from being inserted into the location corresponding with any other color. For example, keying structure 134 may prevent a toner cartridge 100 containing cyan colored toner from being positioned in the location for a black, yellow or magenta toner cartridge. In the example embodiment illustrated, keying structure 134 is positioned on the front 107 of extension section 116 of housing 104 near side 110.

Toner cartridge 100 also includes an electrical connector 136 having processing circuitry for communicating with a controller of image forming device 20. The processing circuitry may provide authentication functions, safety and operational interlocks, operating parameters and usage information related to toner cartridge 100. In the example embodiment illustrated, electrical connector 136 is positioned in a cavity 138 formed in the bottom 106 of housing 104 and surrounded by the front 107, rear 108, and sides 109, 110 of extension section 116. When toner cartridge 100 is installed in image forming device 20, contacts on electrical connector 136 mate with corresponding electrical contacts of image forming device 20 to establish a communications link to the controller of image forming device 20.

Toner cartridge 100 includes alignment features that precisely position toner cartridge 100 in image forming device 20. When toner cartridge 100 is installed in image forming device 20, the various interface features of toner cartridge 100 must align with corresponding interface features on developer unit 200, photoconductor unit 300 and image forming device 20. In its final position in image forming device 20, toner cartridge 100 is positioned in a carriage assembly 308 (FIG. 7) with outlet port 118 aligned and mated with inlet port 208 (FIG. 2) of developer unit 200 for transferring toner from reservoir 102 of toner cartridge 100 to reservoir 202 of developer unit 200. Outlet port 118 and inlet port 208 must be precisely aligned in order to prevent toner leakage between toner cartridge 100 and developer unit 200. Drive gear 132 must align and mate with gear 402 (FIG. 2) in image forming device 20 that provides torque to drive gear 132. If drive gear 132 is misaligned, proper gear mesh may not be achieved, which may result in gear cogging. Electrical contacts on electrical connector 136 must align and mate with corresponding electrical contacts on carriage assembly 308 in order to permit communication between toner cartridge 100 and image forming device 20. The positions of these various interface points must be tightly controlled in order to ensure proper operation of toner cartridge 100.

One alignment feature is a generally vertical slot 140 on front 107 of extension section 116 spaced below outlet port 118 and drive gear 132, toward side 109 from keying structure 134 and toward side 110 from front end 126b of plunger 126. Slot 140 includes an open end 141 that opens toward bottom 106 and a closed top end 142. Slot 140 includes first and second walls 143, 144. Walls 143, 144 may be parallel causing the width of slot 140 to be substantially constant. As shown in FIG. 3, wall 144 may be formed by a rib 145 that projects from the front 107 of extension section 116. When toner cartridge 100 is inserted into carriage assembly 308 as described in greater detail below, slot 140 receives a corresponding positioning rib to control the side-to-side position of toner cartridge 100.

In one embodiment, sides 109, 110 also include alignment features such as slots and/or ribs that control the front-to-rear position of toner cartridge 100 when toner cartridge 100 is inserted into carriage assembly 308. In the example embodiment shown, a generally vertical slot 150 is positioned on side 109 of extension section 116. Slot 150 includes an open end 151 that opens toward bottom 106 and a closed top end 152. Slot 150 includes first and second walls 153, 154. In the example embodiment shown, a generally vertical rib 155 extends from side 110 of extension section 116. When toner cartridge 100 is inserted into carriage assembly 308 as described in greater detail below, slot 150 receives a corresponding positioning rib and rib 155 is received by a corresponding slot to control the front-to-rear position of toner cartridge 100.

With reference to FIGS. 5 and 6, in the embodiment illustrated, toner cartridge 100 includes a pair of guide rails 160, 165 that receive corresponding wings on carriage assembly 308 to provide coarse side-to-side alignment of toner cartridge 100 as toner cartridge 100 is inserted into carriage assembly 308. In the example embodiment illustrated, guide rails 160, 165 are formed as indentations in the sides 109, 110 and rear 108 of main section 114 of housing 104. Specifically, guide rail 160 includes a rearward facing wall 161 and a wall 162 facing side 109 and guide rail 165 includes a rearward facing wall 166 and a wall 167 facing side 110. In the embodiment shown, wall 161 is generally perpendicular to wall 162 and wall 166 is generally perpendicular to wall 167. Each guide rail 160, 165 includes an open bottom end 163, 168. Each guide rail 160, 165 may also include a closed top end 164, 169 roughly midway up main section 114.

With reference back to FIGS. 3 and 4, toner cartridge 100 includes a latch catch 170 such as a latch keeper or strike that receives a latch from carriage assembly 308 to removably affix toner cartridge 100 to carriage assembly 308. Latch catch 170 is positioned on the front 107 of extension section 116 near bottom 106. Specifically, latch catch 170 is spaced below drive gear 132 and outlet port 118 and positioned in the side-to-side direction between outlet port 118 and a center of drive gear 132. In the embodiment shown, latch catch 170 is positioned directly below rib 145 forming wall 144 of slot 140. In the example embodiment shown, latch catch 170 is formed as a hole 172 through the front 107 of extension section 116 having a generally horizontal bottom ledge or shelf 174 on which the latch of carriage assembly 308 may contact. However, latch catch 170 may include any suitable construction as desired for receiving and retaining a latch from carriage assembly 308. For example, in another embodiment, latch catch 170 includes a recess formed on an inner surface of front 107 inside of cavity 138 having a bottom ledge or shelf 174. In another embodiment, latch catch 170 includes a ledge or shelf 174 positioned on the inner surface of front 107 inside of cavity 138. In one embodiment, a front edge 176 of an opening 139 into cavity 138 on bottom 106 includes a portion 176a that extends further forward than an adjacent portion 176b closer to side 109 and an adjacent portion 176c closer to side 110 in order to accommodate the latch of carriage assembly 308. Latch catch 170 and the corresponding latch of carriage assembly 308 control the vertical position of toner cartridge 100 as discussed in greater detail below.

With reference to FIGS. 3 and 6, in the example embodiment illustrated, toner cartridge 100 includes a hold-down stop 180 such as, for example, a tab that extends from a rearmost portion of side 110 of extension section 116. Hold-down stop 180 is positioned roughly midway up extension section 116 and includes a top surface 182 that engages a hold-down feature of carriage assembly 308 in order to assist the insertion of toner cartridge 100 into carriage assembly 308 as discussed in greater detail below.

With reference to FIGS. 5 and 6, in one embodiment, toner cartridge 100 includes a concave depression 190 positioned at the top 105 of the rear 108 of housing 104. Depression 190 serves as a touch point for the user to push toner cartridge 100 toward its final position in carriage assembly 308 as discussed in greater detail below.

Figure 7:
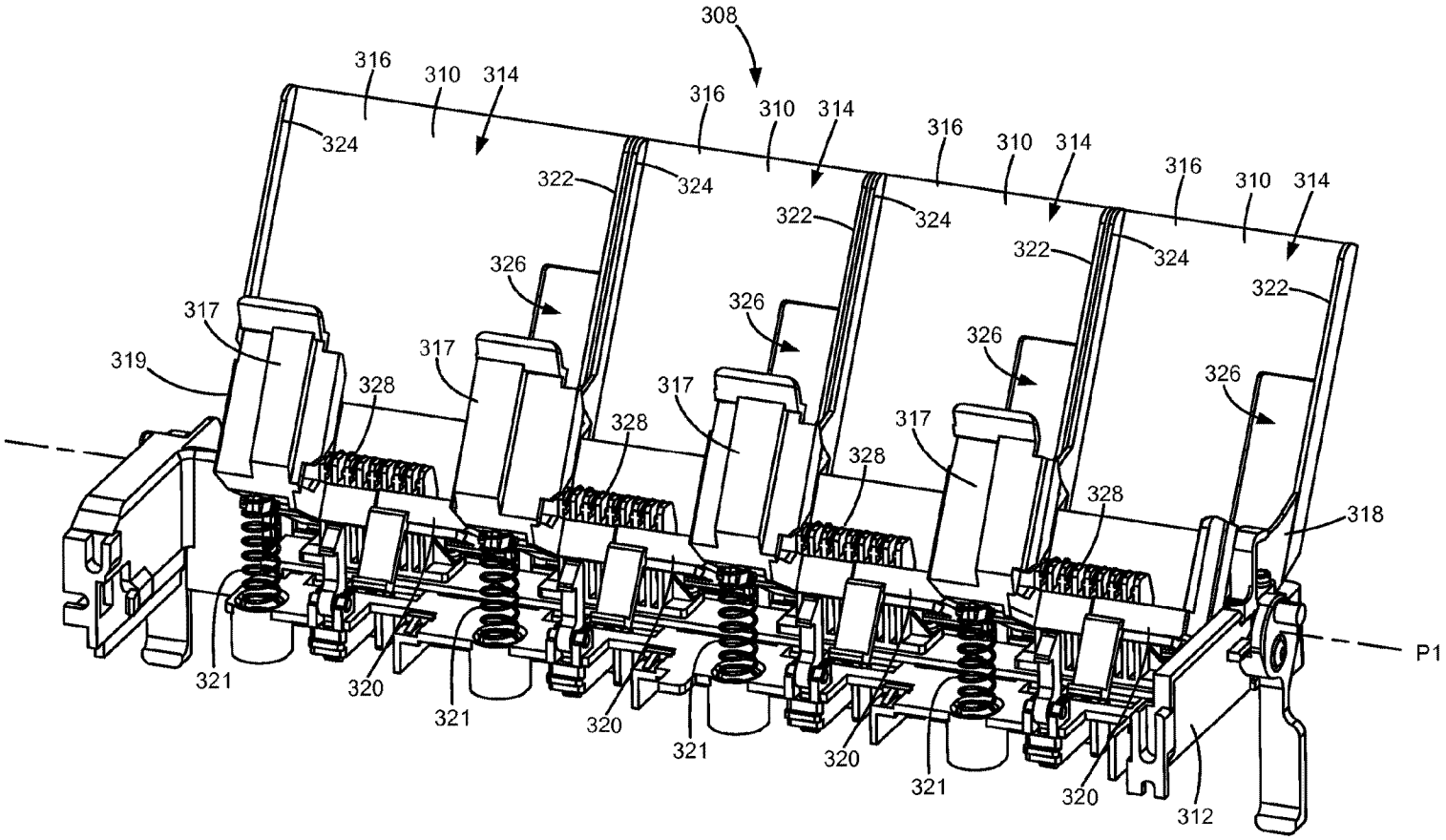
FIG. 7 is a front perspective view of a carriage assembly for holding multiple toner cartridges according to one example embodiment.
Figure 12:
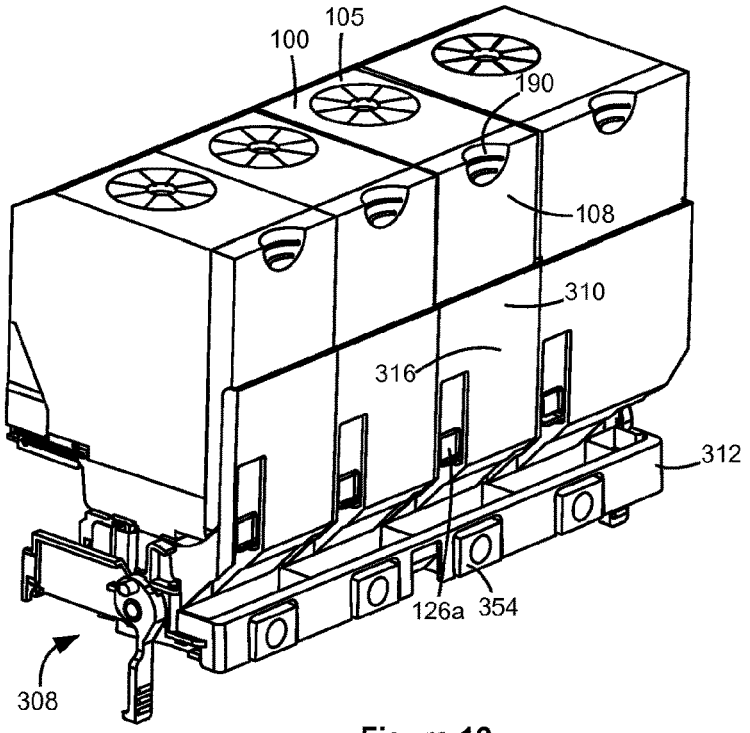
Figure 13:
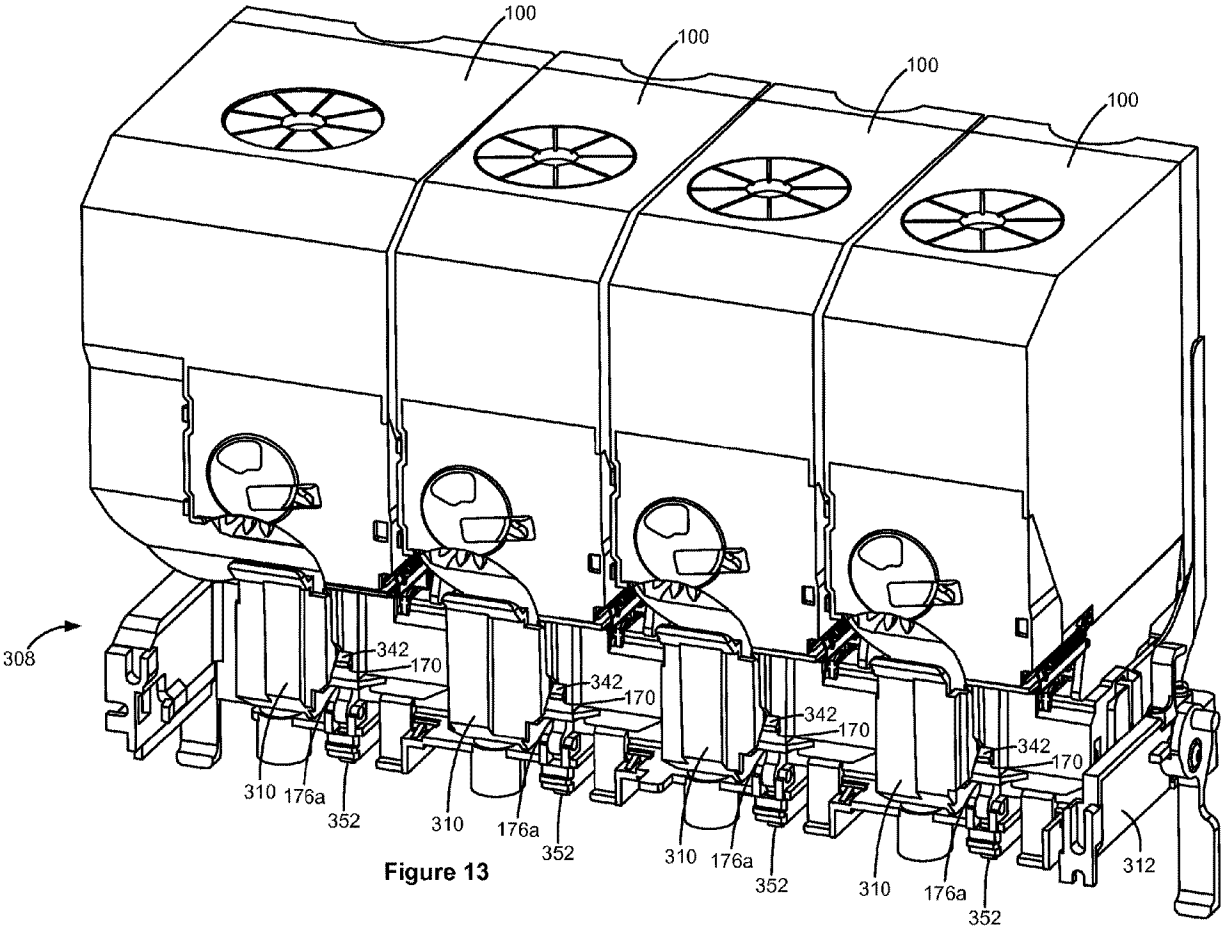
FIG. 13 is a front perspective view of four toner cartridges in their final, seated positions in a carriage assembly according to one example embodiment.

FIG. 7 shows carriage assembly 308 according to one embodiment configured to receive and hold four toner cartridges 100. Carriage assembly 308 may be configured to hold any number of toner cartridges 100 as desired. Carriage assembly 308 may be formed as part of photoconductor unit 300 or may be a separate component of image forming device 20. In the example embodiment illustrated, carriage assembly 308 includes four cradles 310 mounted on a common base 312, which may be formed as a portion of frame 306 or attached to frame 306. Each cradle 310 is independently pivotable about a pivot axis P1 between a loading position as shown in FIG. 7 for receiving a toner cartridge 100 and an operating position as shown in FIGS. 12 and 13 after receiving an installed toner cartridge 100. Each cradle 310 includes a cartridge storage area 314 sized and shaped to receive and hold a toner cartridge 100 having a particular color toner. The cartridge storage area 314 of each cradle 310 is defined by a rear wall 316, a front wall 317, side walls 318 and 319 and a floor 320. In one embodiment, rear wall 316 is taller than front wall 317 and side walls 318 and 319. In this embodiment, rear wall 316 extends roughly midway up main section 114 of toner cartridge 100 when toner cartridge 100 is installed in cradle 310, such as up to closed top ends 164, 169 of guide rails 160, 165. Front wall 317 and side walls 318 and 319 extend roughly the height of extension section 116 of toner cartridge 100 when toner cartridge 100 is installed in cradle 310. In one embodiment, front wall 317 extends across only a portion of front 107 of toner cartridge 100 proximate to side 110.

Each cradle 310 is biased toward the loading position as shown in FIG. 7 such as, for example, by a compression spring 321 positioned between base 312 and floor 320. Alternatively, a torsion spring may be positioned about pivot point P1 of each cradle 310. In the loading position, cradle 310 is tilted rearward with an inner face of the rear wall 316 forming an obtuse angle with the top of base 312. In the operating position, cradle 310 is generally vertical with rear wall 316 extending generally orthogonal to the top of base 312.

The rear wall 316 of each cradle 310 includes a pair of guide wings 322, 324. Guide wings 322, 324 project forward from rear wall 316 at opposite side edges of rear wall 316. Each guide wing 322, 324 is sized and shaped to fit into a corresponding guide rail 160, 165 of toner cartridge 100 when toner cartridge 100 is installed in the cradle 310. The height of each guide rail 322, 324 corresponds to the position of the closed top ends 164, 169 of guide rails 160, 165. Alternatively, this configuration may be reversed such that toner cartridges 100 include guide wings and cradles 310 include complementary guide rails.

The rear wall 316 of each cradle 310 also includes an opening 326 near the side wall 318 of that cradle 310 that permits the actuation member that is operatively coupled to the access door of image forming device 20 to access rear end 126a of plunger 126. In the example embodiment shown, opening 326 is formed as a rectangular shaped hole in rear wall 316; however, any suitable opening may be used as desired. Alternatively, rear wall 316 may include a movable linkage that is depressed by the actuation member of the access door and pushes plunger 126 when the access door is closed and that retracts when the access door is opened. In this alternative, the linkage transfers the force from the actuation member to plunger 126.

Where toner cartridge 100 includes a keying structure 134, an inner surface of front wall 317 may include a complementary keying structure to prevent a toner cartridge 100 from being inserted into the wrong cradle 310 based on the color of toner contained in the toner cartridge 100. For example, keying structure 134 on the toner cartridge 100 may include a projection from the front 107 of extension section 116 of toner cartridge 100 having one of four lateral positions (in the side-to-side direction of toner cartridge 100) based on the color of toner contained therein and the keying structure of each cradle 310 may include a vertical slot having one of four corresponding lateral positions. If a user attempts to insert a toner cartridge 100 into the wrong cradle 310, the toner cartridge 100 will not fit because the keying structure 134 of the toner cartridge 100 will not match the keying structure of cradle 310.

An electrical connector 328 projects upward from base 312 of carriage assembly 308 for each cradle 310. Electrical connectors 328 each have electrical contacts that mate with electrical contacts of the electrical connector 136 of a corresponding toner cartridge 100. Electrical connectors 328 are electrically connected to the controller of image forming device 20 such that when an electrical connector 136 mates with an electrical connector 328, the processing circuitry of the electrical connector 136 is able to communicate with the controller of image forming device 20.

Each cradle 310 also includes alignment features that precisely position the corresponding toner cartridge 100 therein. One alignment feature may include a generally vertical positioning rib that projects from an inner side of the front wall 317 of each cradle 310. As a toner cartridge 100 is inserted into a cradle 310, the generally vertical positioning rib on front wall 317 of the cradle 310 is received by and travels upward in generally vertical slot 140 on front 107 of the toner cartridge 100. The engagement between the positioning rib on front wall 317 of the cradle 310 and slot 140 of the toner cartridge 100 controls the side-to-side position of toner cartridge 100.

Another alignment feature may include slots and/or ribs on an inner side of side wall 318 and/or side wall 319. For example, in one embodiment, a generally vertical positioning rib projects from an inner side of side wall 318 of each cradle 310. As a toner cartridge 100 is inserted into a cradle 310, the generally vertical positioning rib on side wall 318 of the cradle 310 is received by and travels upward in generally vertical slot 150 on side 109 of the toner cartridge 100. In this embodiment, a generally vertical slot is positioned on an inner side of side wall 319 of each cradle 310. As a toner cartridge 100 is inserted into a cradle 310, the slot on side wall 319 of the cradle 310 receives rib 155 on side 110 of the toner cartridge 100 and rib 155 travels downward in the slot on side wall 319. The engagements between the positioning rib on side wall 318 of the cradle 310 and slot 150 of the toner cartridge 100 and between the slot on side wall 319 of the cradle 310 and rib 155 of the toner cartridge 100 control the front-to-rear position of toner cartridge 100.

Figure 8:
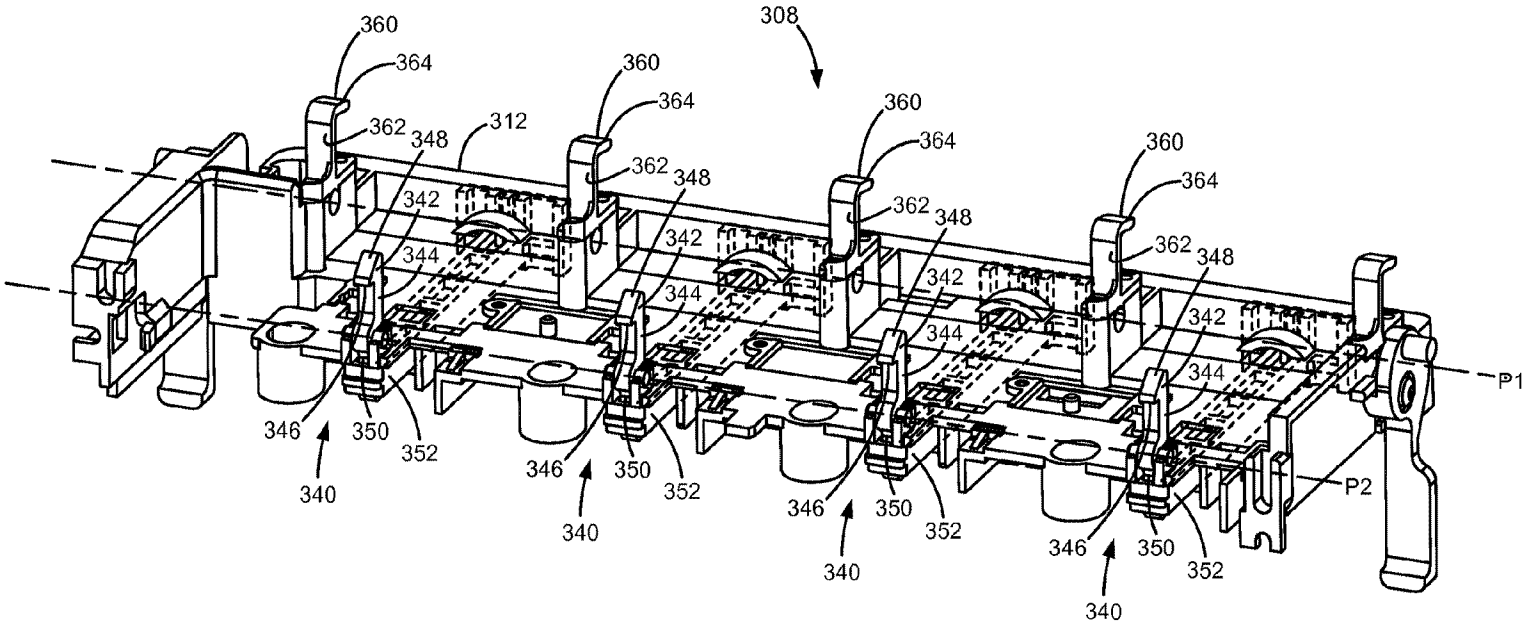
FIG. 8 is front perspective view of the carriage assembly shown in FIG. 7 with cradles for holding the toner cartridges removed.

FIG. 8 shows carriage assembly 308 with cradles 310 and electrical connectors 328 removed for clarity. Base 312 of carriage assembly 308 includes a latch assembly 340 for each cradle 310. Each latch assembly 340 includes a pivotable latch 342 positioned in front of the respective cradle 310. Each latch 342 is pivotable about a pivot axis P2 between a latched position to retain a toner cartridge 100 in the cradle 310 and an unlatched position to release the toner cartridge 100 from the cradle 310. Each latch 342 includes a head 344 extending upward from pivot axis P2 that engages the latch catch 170 of the corresponding toner cartridge 100. Head 344 includes a downward facing latching surface 346 that contacts shelf 174 of latch catch 170. Head 344 also includes a chamfered lead-in 348 that contacts bottom 106 of toner cartridge 100 as toner cartridge 100 is inserted into cradle 310 causing latch 342 to deflect toward the unlatched position as toner cartridge 100 is inserted as discussed in greater detail below. Each latch 342 also includes a leg 350 extending downward from pivot axis P2. A translatable linkage 352 is attached at one end to leg 350 and extends from the front of cradle 310 toward the rear of cradle 310. In the example embodiment illustrated, each linkage 352 extends below base 312 of carriage assembly 308 beneath one of the cradles 310. Each linkage 352 is translatable in the front-to-rear direction toward and away from leg 350 of latch 342. A rear end of each linkage 352 includes an engagement feature such as a button-like area 354 (FIGS. 9-12) that provides a touch point for a user. Each latch 342 is biased toward the latched position. In one embodiment, head 344 of latch 342 extends generally vertically upward in the latched position and as latch 342 moves toward the unlatched position, head 344 pivots toward rear wall 316 of cradle 310. In one embodiment, the bias on each latch 342 is supplied by an extension spring 356 (FIGS. 14 and 15) that biases linkage 352 toward the front of cradle 310. Alternatively, a torsion spring may be positioned about pivot axis P2 of each latch 342 to supply the bias. The operation of latch assembly 340 is discussed in greater detail below.

In one embodiment, carriage assembly 308 also includes a hold-down feature 360 such as, for example, a cam hook that projects upward from base 312 through the floor 320 of each cradle 310 next to side wall 319 near rear wall 316. In the example embodiment illustrated, hold-down feature 360 includes an upward extending support 362 and a rearward facing hook 364 at the upper end of support 362. Hold-down feature 360 helps retain toner cartridge 100 in cradle 310 as discussed in greater detail below.

Figure 9:
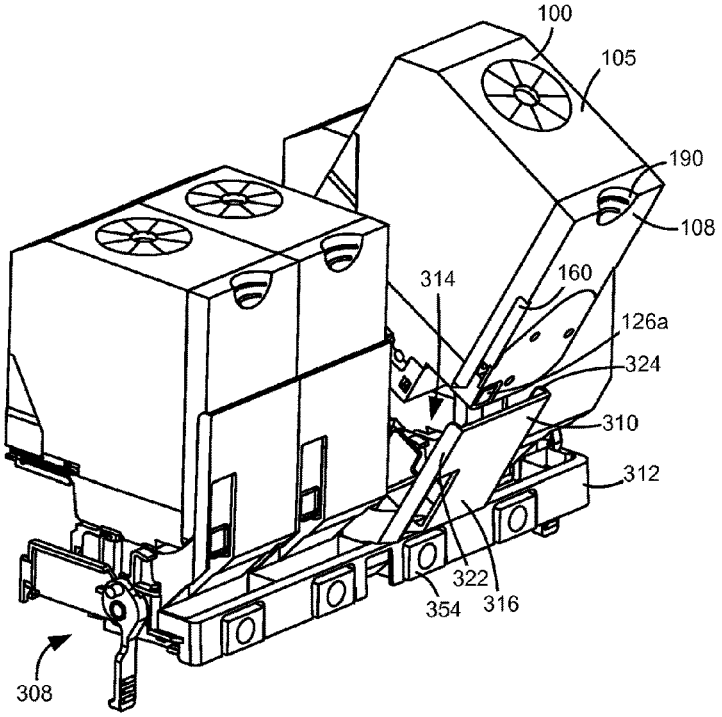
FIGS. 9-12 are sequential perspective views showing the insertion of a toner cartridge into a cradle of a carriage assembly according to one example embodiment.
Figure 10:
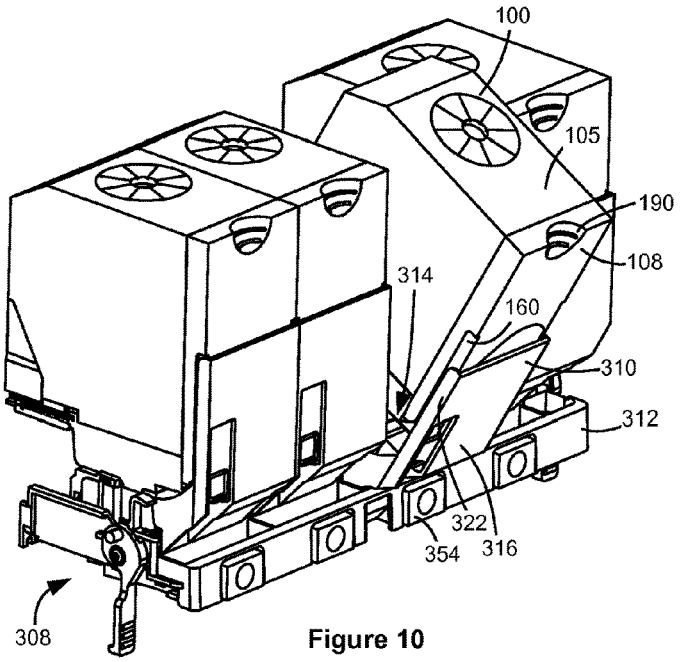
Figure 11:
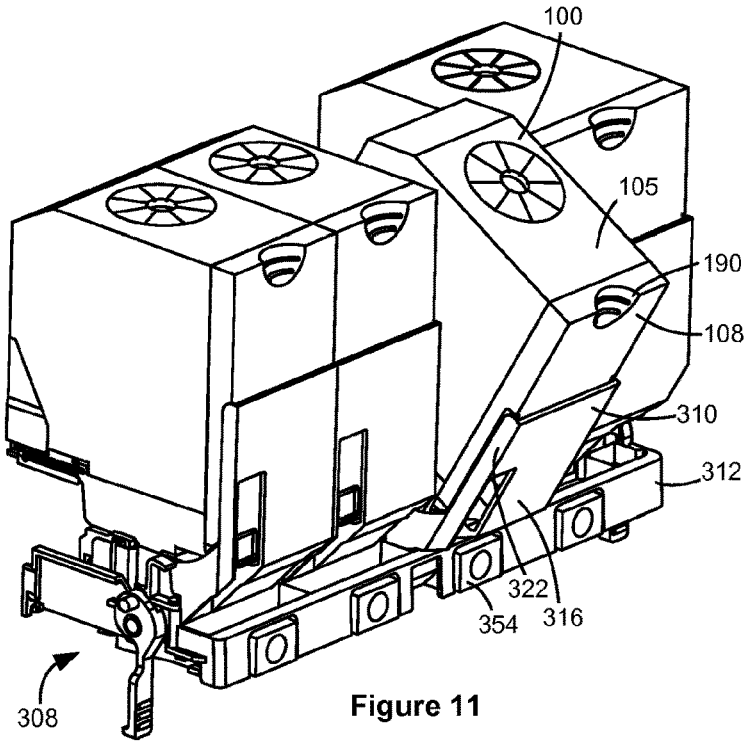

FIGS. 9-12 are sequential views illustrating the insertion of a toner cartridge 100 into a corresponding cradle 310. In FIG. 9, cradle 310 is in the loading position angled toward the access door of image forming device 20 (toward the user) as a result of the bias applied by spring 321. Toner cartridge 100 is slid into cartridge storage area 314 of cradle 310 from above by the user. As shown in FIG. 10, as toner cartridge 100 lowers into cradle 310, guide wings 322, 324 engage guide rails 160, 165 in order to restrain toner cartridge 100 from moving side-to-side within cradle 310. Gravity guides toner cartridge 100 downward against rear wall 316 of cradle 310 until toner cartridge 100 is fully seated as shown in FIG. 11. As toner cartridge 100 lowers into position in cradle 310, slots 140 and 150 of toner cartridge 100 receive the corresponding positioning ribs of cradle 310 and rib 155 engages the corresponding slot of cradle 310 in order to precisely align toner cartridge in the side-to-side and front-to-rear directions.

Once toner cartridge 100 is fully seated in cradle 310 as shown in FIG. 11, a user is able to pivot cradle 310 having toner cartridge 100 therein forward from the loading position to the operating position with minimal force on rear wall 316 of cradle 310 or rear 108 or top 105 of toner cartridge 100. For example, a user may contact depression 190 with his or her fingertip and apply a minimal forward push to overcome the bias applied by spring 321 to move cradle 310 having the toner cartridge 100 from the loading position to the operating position shown in FIG. 12. As cradle 310 pivots forward from the loading position to the operating position with toner cartridge 100 installed therein, the interface features of toner cartridge 100 mate with their corresponding interface features. Specifically, as cradle 310 pivots forward, outlet port 118 lowers onto and mates with inlet port 208 of developer unit 200 (as shown in FIG. 2) so that toner may transfer from reservoir 102 of toner cartridge to reservoir 202 of developer unit 200. As cradle 310 pivots forward, drive gear 132 lowers onto and meshes with gear 402 (as shown in FIG. 2) in order to receive torque from gear 402. As cradle 310 pivots forward, electrical connector 136 lowers onto electrical connector 328 such that the electrical contacts of each connector 136, 328 mate in order to establish a communications link between the processing circuitry of electrical connector 136 and the controller of image forming device 20.

Figure 14:
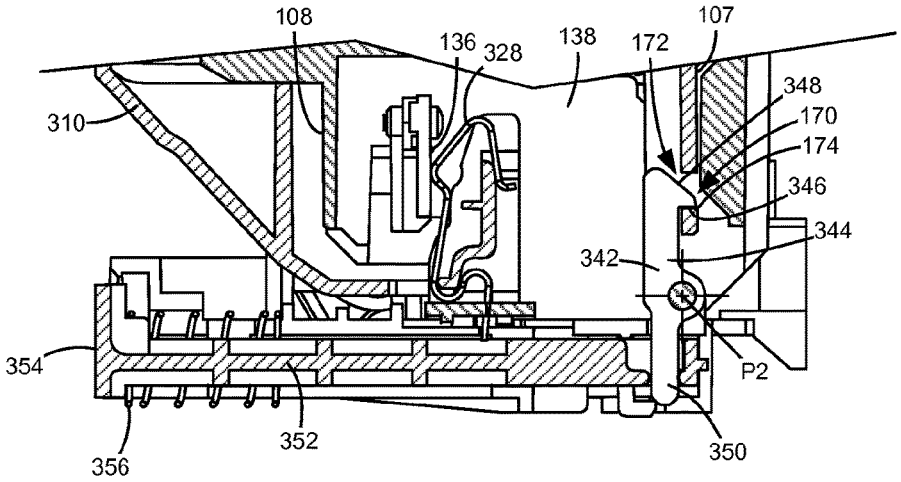
FIG. 14 is a cross-sectional view of a toner cartridge in its final, seated position in a carriage assembly with a latch in a latched position for retaining the toner cartridge according to one example embodiment.
Figure 15:
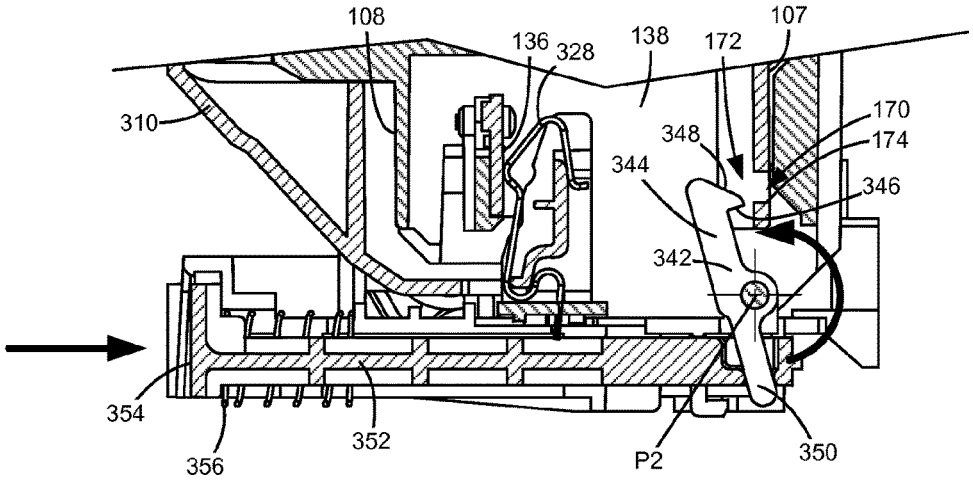
FIG. 15 is a cross-sectional view of a toner cartridge in its final, seated position in a carriage assembly with a latch in an unlatched position for releasing the toner cartridge according to one example embodiment.

With reference to FIGS. 13-15, as cradle 310 pivots forward, portion 176a of the front edge 176 of opening 139 into cavity 138 on the bottom 106 of toner cartridge 100 contacts the top of chamfered lead-in 348 of latch 342 causing latch 342 to pivot about pivot axis P2 from the latched position to the unlatched position (counterclockwise as viewed in FIG. 14). As cradle 310 pivots forward further (and toner cartridge 100 lowers further as a result), head 344 of latch 342 reaches latch catch 170 and the bias on latch 342 returns latch 342 to the latched position with latching surface 346 engaged with shelf 174 as shown in FIG. 14. FIGS. 13 and 14 show toner cradle 310 in the operating position fully pivoted forward with toner cartridge 100 in its final position in image forming device 20. In this position, the engagement between latch 342 and latch catch 170 prevents spring 321 from returning cradle 310 to the loading position. In this manner, the engagement between latch 342 and latch catch 170 controls the vertical position of toner cartridge 100. More specifically, spring 321 pushes shelf 174 of latch catch 170 (by way of the force applied by spring 321 to cradle 310) into contact with latching surface 346 of latch 342. By precisely aligning toner cartridge 100 vertically with developer unit 200, latch catch 170 controls the distance between outlet port 118 and inlet port 208 thereby allowing the height of any foam or sealing materials around outlet port 118 and/or inlet port 208 to be reduced. The reduction in height of the foam or sealing materials reduces the inside surface area of such seals and thereby reduces the risk of toner leakage at the interface between outlet port 118 and inlet port 208. The return of latch 342 to the latched position when latch 342 engages latch catch 170 produces a clicking sound that provides audible feedback to the user to let the user know that toner cartridge 100 is fully seated.

In its final, seated position, plunger 126 of toner cartridge 100 is positioned to receive the actuation member coupled to the access door of image forming device 20. Specifically, when the user closes the access door, the actuation member engages rear end 126a of plunger 126 and pushes plunger 126 forward. This causes front end 126b of plunger 126 to contact and push shutter 120 from the closed position to the open position in order to permit toner flow from toner cartridge 100 to developer unit 200. In this manner, toner cartridge 100 is seated and latched before shutter 120 is opened in order to reduce the risk of leaking toner from outlet port 118. When the user opens the access door, the actuation member coupled to the access door disengages from plunger 126 causing plunger 126 to retract as a result of the bias applied by spring 130. The retraction of plunger 126 in turn causes shutter 120 to move from the open position to the closed position as a result of the bias applied by spring 124.

With reference to FIGS. 14 and 15, with the access door open, a user may remove a particular toner cartridge 100 by pressing the button-like area 354 of the latch assembly 340 associated with the cradle 310 holding the cartridge 100. When button-like area 354 is pressed and the bias applied to linkage 352 by spring 356 is overcome, linkage 352 translates forward (to the right as viewed in FIGS. 14 and 15). The forward translation of linkage 352 pushes leg 350 of latch 342 forward causing latch 342 to pivot from the latched position to the unlatched position (counterclockwise as viewed in FIGS. 14 and 15) with head 344 of latch 342 moving away from latch catch 170 as shown in FIG. 15. When head 344 disengages from latch catch 170, cradle 310 is no longer held down by latch 342 allowing the bias applied to cradle 310 by spring 321 to rotate cradle 310 from the operating position to the loading position (counterclockwise as viewed in FIGS. 14 and 15). As toner cartridge 100 and cradle 310 pivot from the operating position to the loading position, drive gear 132 separates from gear 402, outlet port 118 separates from inlet port 208 and electrical connector 136 separates from electrical connector 328. As shown in FIG. 11, when cradle 310 is in the loading position, cradle 310 and toner cartridge 100 are angled rearward presenting toner cartridge 100 to the user for removal. In order to remove toner cartridge 100 from cradle 310, the user simply grasps toner cartridge 100 on its sides 109, 110 and pulls toner cartridge 100 upward sliding cartridge 100 out of cradle 310 with minimal force.

The position of latch catch 170 on toner cartridge 100 reduces the risk of toner leaking between outlet port 118 of toner cartridge and inlet port 208 of developer unit 200 and the risk of drive gear 132 from losing gear mesh with gear 402. Specifically, latch catch 170 is spaced forward from pivot axis P1 of toner cartridge 100 installed in cradle 310 below the interface between outlet port 118 and inlet port 208 and below the mesh between drive gear 132 and gear 402. Latch catch 170 is also laterally positioned (side-to-side direction) between outlet port 118 and the center of drive gear 132. The engagement between latch 342 and latch catch 170 at this position prevents front-to-rear torque and side-to-side torque on toner cartridge 100. This prevents drive gear 132 from separating from gear 402 and outlet port 118 from separating from inlet port 208 thereby reducing the risks of drive failure and toner leakage.

Figure 16A:
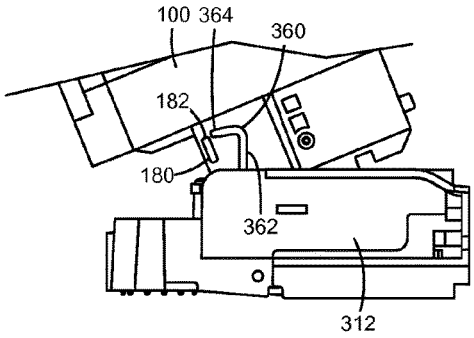
FIGS. 16A-D are sequential side views showing a toner cartridge pivoting from a loading position to an operating position in a carriage assembly having a hold-down feature according to one example embodiment.
Figure 16B:
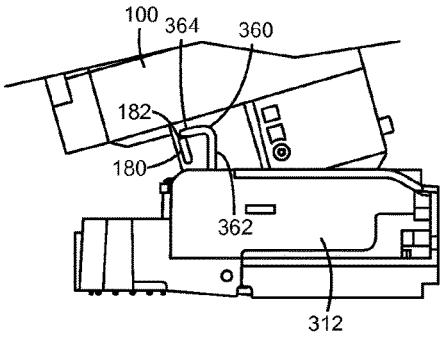
Figure 16C:
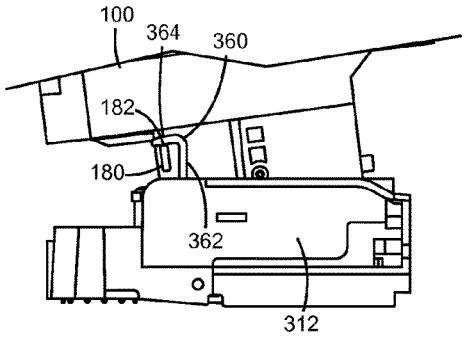
Figure 16D:
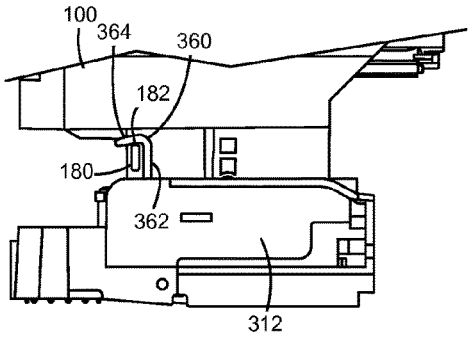

FIGS. 16A-D are sequential views illustrating toner cartridge 100 in cradle 310 pivoting from the loading position to the operating position according to one embodiment with cradle 310 removed for clarity. In this embodiment, toner cartridge 100 is held down in the direction of floor 320 of cradle 310 by the engagement between hold-down stop 180 on toner cartridge and hold-down feature 360 on carriage assembly 308 as toner cartridge 100 and cradle 310 pivot forward in order to ensure that toner cartridge 100 seats properly with its interface features fully engaged. In FIG. 16A, toner cartridge 100 is shown seated in cradle 310 in the loading position (also shown in FIG. 11). In this position, hold-down stop 180 is spaced behind and clear of hold-down feature 360. As toner cartridge 100 and cradle 310 are rotated forward toward the operating position as shown in FIGS. 16B and 16C, hold-down stop 180 passes under hook 364. Hook 364 holds toner cartridge 100 down as cradle 310 rotates forward by contacting top surface 182 of hold-down stop 180. Without hold-down feature 360, toner cartridge 100 could tend to creep upward due to the forces applied to bottom 106 of toner cartridge 100 by latch 342 and electrical connector 328. With hold-down feature 360 and hold-down stop 180 engaged, the user does not need to apply a downward force on toner cartridge 100 in order to ensure that cartridge 100 remains fully seated in cradle 310 as cradle 310 rotates forward making it easier for the user to install toner cartridge 100. As shown in FIG. 16D, when cradle 310 is rotated fully to the operating position (also shown in FIG. 12), hold-down feature 360 prevents toner cartridge 100 from lifting out of cradle 310. This prevents toner cartridge 100 from separating from cradle 310 if image forming device 20 is dropped or turned upside down (e.g., during shipping) with toner cartridge 100 installed therein thereby reducing the risk of toner leakage. Hook 364 prevents toner cartridge 100 from being inserted into cradle 310 unless cradle 310 is fully pivoted to the loading position ensuring that toner cartridge 100 cannot be partially inserted which may result in a connection error between electrical connector 136 and electrical connector 328. In one embodiment, hold-down feature 360 is positioned directly above pivot point P1 of cradles 310. In this embodiment, hold-down stop 180 is positioned above and slightly behind the pivot point of toner cartridge 100 as cradle 310 holding toner cartridge 100 pivots from the loading position to the operating position. As a result, hold-down stop 180 is positioned to travel from a position clear of hold-down feature 360 when cradle 310 is in the loading position to position underneath hold-down feature 360 when cradle 310 is in the operating position in order to prevent toner cartridge 100 from lifting out of cradle 310.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A toner cartridge for use in an image forming device, comprising:

a housing having a front, a rear opposite the front, a first side, a second side opposite the first side, a top and a bottom opposite the top, the housing having a reservoir for holding toner;

an outlet port on the front of the housing [proximate] *positioned closer to* the first side *than the second side* for transferring toner out of the reservoir;

a drive gear on the front of the housing having a center [proximate] *positioned closer to* the second side *than the outlet port is to the second side* for receiving rotational power when the toner cartridge is installed in the image forming device;

a cavity formed in the bottom of the housing; and a latch catch in the cavity on an inner side of the front of the housing for receiving a latch for securing the toner cartridge in the image forming device, the latch catch being positioned closer to the bottom of the housing than the outlet port and the drive gear *are to the bottom of the housing*, the latch catch being positioned between the center of the drive gear and the outlet port in a side-to-side direction from the first side to the second side of the housing.

2. The toner cartridge of claim 1, further comprising a generally vertical positioning slot on the front of the housing positioned closer to the bottom of the housing than the outlet port and the drive gear *are to the bottom of the housing*, the generally vertical positioning slot being formed between first and second side walls and having an open bottom end, the first side wall being [proximate] *positioned closer to* the first side of the housing *than the second side wall is to the first side of the housing* and the second side wall being [proximate] *positioned closer to* the second side of the housing *than the first side wall is to the second side of the housing*, wherein the latch catch is positioned directly below the first side wall of the generally vertical positioning slot.

3. The toner cartridge of claim 2, wherein the first side wall is formed by a rib projecting from the front of the housing and the latch catch is positioned directly below the rib.

4. The toner cartridge of claim 1, wherein a portion of a front edge of an opening into the cavity on the bottom of the housing below the latch catch extends further forward than an adjacent portion of the front edge of the opening into the cavity on the bottom of the housing closer to the first side of the housing.

5. The toner cartridge of claim 1, further comprising a pair of guide rails on the rear of the housing, one of the pair of guide rails being positioned at each of the first side and the second side, the guide rails being indentations in the first side and the second side, respectively, at the rear of the housing, the indentations each having an open bottom end, the indentations running from the open bottom ends vertically upward toward the top of the housing.

6. The toner cartridge of claim 1, further comprising a hold-down stop extending from a rearmost portion of the second side of the housing closer to the bottom of the housing than the outlet port and the drive gear *are to the bottom of the housing*, a top of the hold-down stop being unobstructed to engage a corresponding hold-down feature in the image forming device during insertion of the toner cartridge into the image forming device.

7. The toner cartridge of claim 1, wherein the latch catch includes a generally horizontal shelf positioned to contact the latch when the toner cartridge is installed in the image forming device.

8. The toner cartridge of claim 7, wherein the latch catch includes one of a hole through the front of the housing and a recess formed on the inner side of the front of the housing.

9. A toner cartridge for use in an image forming device, comprising:

a housing having a front, a rear opposite the front, a first side, a second side opposite the first side, a top and a bottom opposite the top, the housing having a reservoir for holding toner;

an outlet port on the front of the housing proximate the first side for transferring toner out of the reservoir;

a drive gear on the front of the housing having a center proximate the second side for receiving rotational power when the toner cartridge is installed in the image forming device;

a cavity formed in the bottom of the housing;

an electrical connector positioned in the cavity for establishing a communications link when the toner cartridge is installed in the image forming device; and a latch catch on the front of the housing unobstructed to receive a latch from within the cavity on an inner side of the front of the housing for securing the toner cartridge in the image forming device, the latch catch being positioned closer to the bottom of the housing than the outlet port and the drive gear, the latch catch being positioned between the center of the drive gear and the outlet port in a side-to-side direction from the first side to the second side of the housing.

10. The toner cartridge of claim 9, further comprising a generally vertical positioning slot on the front of the housing positioned closer to the bottom of the housing than the outlet port and the drive gear, the generally vertical positioning slot being formed between first and second side walls and having an open bottom end, the first side wall being proximate the first side of the housing and the second side wall being proximate the second side of the housing, wherein the latch catch is positioned directly below the first side wall of the generally vertical positioning slot.

11. The toner cartridge of claim 9, wherein a portion of a front edge of an opening into the cavity on the bottom of the housing below the latch catch extends further forward than an adjacent portion of the front edge of the opening into the cavity on the bottom of the housing closer to the first side of the housing.

12. The toner cartridge of claim 9, further comprising a pair of guide rails on the rear of the housing, one of the pair of guide rails being positioned at each of the first side and the second side, the guide rails being indentations in the first side and the second side, respectively, at the rear of the housing, the indentations each having an open bottom end, the indentations running from the open bottom ends vertically upward toward the top of the housing.

13. The toner cartridge of claim 9, further comprising a hold-down stop extending from a rearmost portion of the second side of the housing closer to the bottom of the housing than the outlet port and the drive gear, a top of the hold-down stop being unobstructed to engage a corresponding hold-down feature during insertion of the toner cartridge into the image forming device.

14. The toner cartridge of claim 9, wherein the latch catch includes a generally horizontal shelf positioned to contact the latch when the toner cartridge is installed in the image forming device.

15. The toner cartridge of claim 14, wherein the latch catch includes one of a hole through the front of the housing and a recess formed on the inner side of the front of the housing.

16. A toner cartridge for use in an image forming device, comprising:

a housing having a front, a rear opposite the front, a first side, a second side opposite the first side, a top and a bottom opposite the top, the housing having a reservoir for holding toner;

an outlet port on the front of the housing [proximate] *positioned closer to* the first side *than the second side* for transferring toner out of the reservoir;

a drive gear on the front of the housing having a center [proximate] *positioned closer to* the second side *than the outlet port is to the second side* for receiving rotational power when the toner cartridge is installed in the image forming device;

a cavity formed in the bottom of the housing;

an electrical connector positioned in the cavity for establishing a communications link when the toner cartridge is installed in the image forming device; and a latch receiving shelf in the cavity on an inner side of the front of the housing unobstructed to receive a latch for securing the toner cartridge in the image forming device, the latch receiving shelf defining the vertical position of the toner cartridge when the toner cartridge is installed in the image forming device, the latch receiving shelf being positioned closer to the bottom of the housing than the outlet port and the drive gear *are to the bottom of the housing*, the latch receiving shelf being spaced above the bottom of the housing, the latch receiving shelf being positioned between the center of the drive gear and the outlet port in a side-to-side direction from the first side to the second side of the housing.

17. The toner cartridge of claim 16, further comprising a generally vertical positioning slot on the front of the housing positioned closer to the bottom of the housing than the outlet port and the drive gear *are to the bottom of the housing*, the generally vertical positioning slot being formed between first and second side walls and having an open bottom end, the first side wall being [proximate] *positioned closer to* the first side of the housing *than the second side wall is to the first side of the housing* and the second side wall being [proximate] *positioned closer to* the second side of the housing *than the first side wall is to the second side of the housing*, wherein the latch receiving shelf is positioned directly below the first side wall of the generally vertical positioning slot.

18. The toner cartridge of claim 16, wherein a portion of a front edge of an opening into the cavity on the bottom of the housing below the latch receiving shelf extends further forward than an adjacent portion of the front edge of the opening into the cavity on the bottom of the housing closer to the first side of the housing.

19. The toner cartridge of claim 16, further comprising a pair of guide rails on the rear of the housing, one of the pair of guide rails being positioned at each of the first side and the second side, the guide rails being indentations in the first side and the second side, respectively, at the rear of the housing, the indentations each having an open bottom end, the indentations running from the open bottom ends vertically upward toward the top of the housing.

20. The toner cartridge of claim 16, further comprising a hold-down stop extending from a rearmost portion of the second side of the housing closer to the bottom of the housing than the outlet port and the drive gear *are to the bottom of the housing*, a top of the hold-down stop being unobstructed to engage a corresponding hold-down feature during insertion of the toner cartridge into the image forming device.

21. The toner cartridge of claim 16, further comprising one of (1) a hole through the front of the housing, a bottom surface of the hole forming the latch receiving shelf; and (2) a recess formed on the inner side of the front of the housing, a bottom surface of the recess forming the latch receiving shelf.

* * * * *